United States Patent [19]

Snapp, Jr.

[11] 4,141,665

[45] Feb. 27, 1979

[54] LOCKABLE JOINT FOR ARTICULATED MEMBERS

[76] Inventor: Edward A. Snapp, Jr., P.O. Box 295, Columbus, Miss. 39701

[21] Appl. No.: 833,053

[22] Filed: Sep. 14, 1977

[51] Int. Cl.² .................... F16C 11/00; F16D 1/12
[52] U.S. Cl. ..................... 403/100; 403/65; 403/102; 297/379
[58] Field of Search ............ 403/99, 100, 101, 102, 403/65, 113; 248/188; 297/379, 378

[56] References Cited

U.S. PATENT DOCUMENTS

| 783,456 | 2/1905 | McKenna | 403/99 |
|---|---|---|---|
| 1,724,694 | 8/1929 | Chamberlain | 403/99 |
| 2,487,401 | 11/1949 | Turner | 403/65 |
| 3,547,054 | 12/1970 | Caldwell | 403/99 X |
| 3,795,379 | 9/1972 | Gray | 403/99 X |

FOREIGN PATENT DOCUMENTS 599210  3/1948  United Kingdom ............... 403/99

*Primary Examiner*—Wayne L. Shedd
*Attorney, Agent, or Firm*—Wigman & Cohen

[57] ABSTRACT

A lockable joint for releasably locking two relatively articulated members in longitudinally aligned, load-bearing relation to one another is disclosed. The articulated members are connected together by a shaft carried by one member which shaft pivotally engages a cam slot carried by the other member. The confronting ends of the members are provided with a plurality of interdigitating or nesting surfaces which interlock with each other upon application of a longitudinal force applied to one or both of the members. The cam slot and shaft are designed and constructed to cause relative angular articulation of the members in response to the longitudinally applied force.

13 Claims, 9 Drawing Figures

LOCKABLE JOINT FOR ARTICULATED MEMBERS

BACKGROUND OF THE INVENTION

The present invention relates to a lockable joint for articulated members and more particularly to a joint locked in axial alignment by engagement of complimentary nesting surfaces on the members.

A search of the prior art failed to uncover any patents which disclosed the lockable joint of the present invention. A number of patents were uncovered which disclose various devices for locking or latching articulated members relative to one another. The following is a listing of such patents uncovered during the aforementioned prior art search:

U.S. Pat. No. 553,650; U.S. Pat. No. 788,223; U.S. Pat. No. 875,195; U.S. Pat. No. 1,668,290; U.S. Pat. No. 2,466,205; U.S. Pat. No. 2,690,369; U.S. Pat. No. 3,547,054.

U.S. Pat. No. 553,650 to Kingsland discloses a lock chain device particularly for use in flue-cleaning apparatus and comprises a plurality of elongated links pivotally connected in end-to-end relation. The end of one link is provided with a pin and an irregular recess which receives respectively a longitudinal slot and a projection having a shape corresponding to the irregular recess such that, when axially aligned, the confronting link ends may be thrust together. Locking of the links together, therefore, requires that external rotational forces be applied to longitudinally align the links prior to urging them into locking engagement.

U.S. Pat. No. 788,223 to Simpson and U.S. Pat. No. 1,668,290 to Stevens each disclose a foldable carpenter's square. The square devices disclosed in these patents comprise two limbs pivotally connected together by a pin and an elongate slot so that the limbs may be pivoted either to a parallel folded position for ease of transportation or to a right-angled position for use as a carpenter's square. The pivotally connected ends of the limbs are provided with complementary mating surfaces which lockably engage only when the limbs are positioned at right angles to each other and urged together.

U.S. Pat. No. 875,195 to Loftin, U.S. Pat. No. 2,466,205 to Burr and U.S. Pat. No. 2,690,369 to Laskey et al. all disclose folding tables having legs pivotable between a collapsed position parallel to the table surface and an erected position normal to the table surface. The legs of the tables of each of these patents are pivotally connected at the table corners by means of pins, bolts or studs engaging in L-shaped slots or apertures. Cooperating elements on both the table top and legs are provided for latching the legs in their erected positions. In the case of each of these prior art devices, the legs are manually articulated into positions with the matching elements in alignment and then urged into their latched positions.

U.S. Pat. No. 3,547,054 to Caldwell et al. discloses a folding telescopic support or leg which is resiliently biased for selectively and releasably securing the leg in a folded or erected position. The leg is pivotally connected to a support surface such as a table top by a pivot bearing received in a longitudinal slot in the upper end of the leg. Both the table top and leg are provided with coacting latch elements arranged on opposite sides of the pivot bearing and which are resiliently biased into their latched position upon alignment of the latch elements.

It should be apparent, therefore, that while the aforedescribed devices provide useful locking joints for relatively articulated members in certain applications, they fail to provide a mechanism by which angularly offset members are articulated into alignment and locked and vice versa by a rotational moment resulting from a force applied longitudinally to one or both of the members. Typically, the prior art devices are designed and constructed so that the articulated members and their latching elements must be in substantial alignment before they can be urged into their latched positions. In applications where precise initial alignment of the articulated member is not possible, desired, or economically feasible, such prior art mechanisms are unsuitable and would be subject to numerous malfunctions, such as jamming, binding and the like.

SUMMARY AND OBJECTS OF THE INVENTION

In view of the foregoing limitations and shortcomings of the prior art devices, as well as other disadvantages not specifically mentioned above, it is a primary objective of this invention to provide a lockable joint for relatively articulated members wherein the members can be urged into locking relation even when the members are angularly offset relative to one another a substantial angle from a condition of alignment.

More particularly, it is an object of this invention to provide a lockable joint for pivotally connected members wherein the coaction between the pivot elements, in response to an axial force applied to one or both of the members either toward or away from the locked position, results in angular articulation of the members relative to each other.

Still more particularly, it is an object of this invention to provide a lockable joint for articulated members wherein any longitudinal loading of either or both members of the joint mechanism, prior to locking and within a design range of angular offset of the members with respect to one another, progressively rotates the members into alignment and urges them toward a locked position.

Yet another object of this invention is to provide an improved lockable joint for articulated members wherein the members are provided with interdigitating surfaces configured and arranged to provide maximum load bearing surfaces and to assure longitudinal and transverse stability of the joint.

It is another object of this invention to provide a simple, economically constructed, durable and compact lockable joint for articulated members.

Briefly described, the aformentioned objects are accomplished according to the invention by providing a lockable joint mechanism for releasably locking two relatively articulatable members into longitudinally aligned, load-bearing relation. The members are pivotally connected together by means of a shaft carried by one member, which shaft engages in a cam slot carried by the other member. The cam slot is formed of two intersecting portions, a first straight portion which is longitudinally aligned with the axis of its associated member and a second arcuate portion which is generally curvilinear along substantially its entire length and emanates from a point both longitudinally and transversely offset from the intersection of the cam slot portions. The arcuate portion of the cam slot is designed, according to an important aspect of the invention, to cause or generate a rotational force or moment between the members in response to a force applied longitudinally to one or both of the members so as to cause them to angularly articulate relative to one another. This rotational force is generated when the longitudinal force is applied to urge the members either toward the locked position or toward the unlocked position. Thus, for example, if the axes of the articulated members are angularly offset from one another in an unlocked position and within the design range of angular offset, any substantially longitudinally applied force to one of the members will urge the shaft against one side of the curved cam slot portion and thereby relatively rotate the members toward their locked position. Likewise, from the locked position of the joint, a substantially longitudinally applied force to one of the members, i.e., a tension force, will urge the shaft against the other side of the curved cam slot portion and thereby relatively rotate the members toward an unlocked, angularly offset position.

The confronting ends of the members are provided with a plurality of complementary mating or interdigitating surfaces, which, when urged into engagement with each other by an appropriately directed axial force to one or both of the members, securely interlocks the members together. The mating surfaces of a respective member preferably include at least two planar surfaces arranged longitudinally of such member, at least two planar surfaces arranged transversely of such member and at least one planar surface inclined with respect to the longitudinal axis of such member.

The mating surfaces also advantageously provide guide or interaction surfaces which augment the rotational or angular articulating force resulting from the coaction of the shaft and curved cam slot portion. For example, as the members are urged toward their locked position by an axial force, an intersecting corner of two of the perpendicular planar surfaces bears against the inclined planar surface and slides along such inclined surface toward the locked position of the joint.

In view of the teachings herein, by appropriate design and construction of the cam slot, the shaft and the mating surfaces of the members according to well-understood mechanical design principles, the design range of angular offset of the members within which the lockable joint of the invention is operative can be greatly varied. The preferred range is between about 45° to 0°, although a greater range may, in some instances, be possible. In the described embodiment, the preferred range is between about 25° and 0°. Also, it should be apparent to those skilled in the art that while the lockable joint of the invention is described in connection with lockably engaging two elongate members, the principles of the invention would apply to a joint between a planar element and an elongate member, such as between a table and its legs and the like.

The terms "longitudinally" and "axially" are used essentially interchangeably in the description and claims herein and refer to the portions of the articulated members adjacent the joint, regardless of the particular elements or structures arranged at the opposite ends of the articulated members. While not limited thereto, the lockable joint of the present invention is useful in many and varied applications, for example, in aircraft landing gear and wing locks, in joints for walking braces and prosthetic devices, such as artificial knee joints, in automobile safety door locks, in "jackknife" drill rig locks and the like.

With these and other objects, advantages and features of the invention that may become hereinafter apparent, the nature of the invention may be more clearly understood by reference to the following detailed description of the invention, the appended claims and to the several views illustrated in the attached drawings, wherein:

DETAILED DESCRIPTION OF A PREFERRED EMBODIMENT

Figure 1:
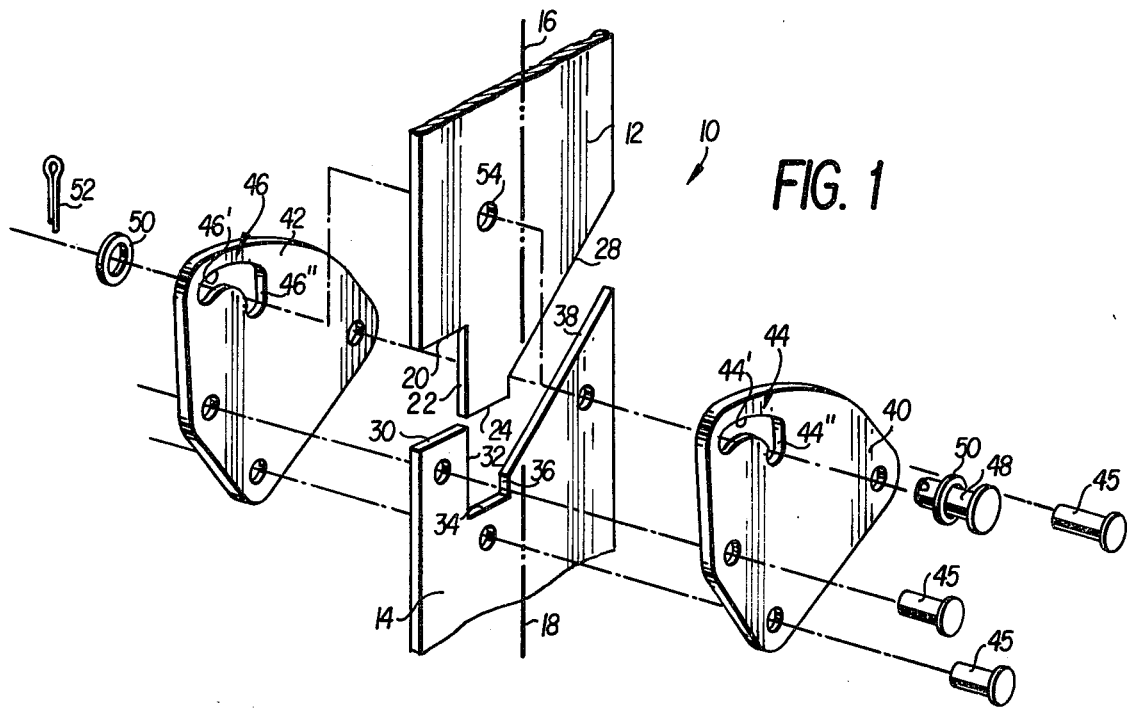
FIG. 1 is an exploded view in perspective of a preferred first embodiment of the lockable joint of the present invention.

Referring now in detail to the drawings wherein like parts are identified by like reference numerals, there is illustrated in FIG. 1, in exploded perspective, the lockable joint of the present invention designated generally by reference numeral 10. Two members 12 and 14 of substantially the same thickness and having longitudinal axes 16 and 18, respectively, are connected to be articulated relative to each other in the plane of the members by a suitable, but not particularly illustrated mechanism. Such articulation mechanisms may include hydraulic or air-operated devices, mechanical, manually-actuated devices or the like and are adapted to apply a force along either or both of the longitudinal axes 16, 18 in a direction toward or away from the opposite member, that is, in tension or in compression. The confronting ends of the members 12, 14 are provided with a plurality of mating or interdigitating surfaces, namely, the essentially projecting end surfaces 20-28 of member 12 which are received in and mate with the essentially recessed end surfaces 30-38 of member 14. Mating surfaces 20, 30 and 24, 34 are arranged substantially perpendicular or transverse to the axes 16, 18, surfaces 22, 32 and 26, 36 are arranged substantially parallel to axes 16, 18 and inclined surfaces 28, 38 are arranged at an angle to such axes. When engaged, for example, by a force applied along axis 16 to member 12, the surfaces 20-28 interlock with surfaces 30-38 to provide a transversely stable, load-bearing joint.

A pair of identical side plates 40, 42 are arranged on either side of member 14 and are securely attached thereto by means of rivets 44, by welding, adhesives or other suitable means. It will be apparent that securement of the side plates 40, 42 to member 14 will provide a slot between the side plates in which slot the end of member 12 is guided and which arrangement resists torsional forces between the members. The side plates 40, 42 are provided with identical cam slots 44, 46, each having arcuate and straight portions 44', 44" and 46', 46", respectively, and the function of which will be hereinafter described. A shaft or pin 48, provided with bearing washers 50 and cotter pin 52, penetrates both cam slots 44, 46 and an aperture 54 in member 12 in a manner to pivotally secure the members 12 and 14 together for relative angular articulation in their common plane.

In the embodiment shown in FIG. 1, the shaft 48 is spatially fixed relative to the member 12 and the cam slots 44, 46 are spatially fixed relative to the member 14, however, as described in connection with other exemplary embodiments herein, the converse arrangement is also possible without departing from the scope of the invention described herein. Moreover, structure equivalent to one or both of the side plates 44, 46 may be affixed to the member 12 and provided with either the equivalent of shaft 48 or cam slots 44, 46. Thus, numerous variations of the FIG. 1 arrangement are possible, provided the cam slot is substantially fixed relative to one member and the shaft substantially fixed relative to the other member.

Figure 2A:
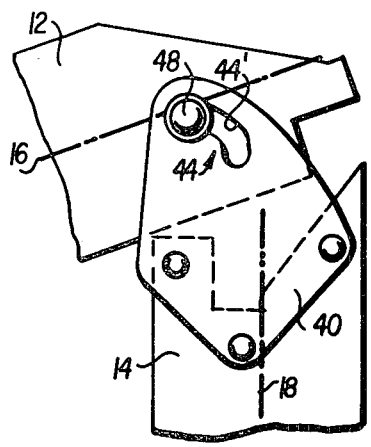
FIGS. 2A-2E are side views of the lockable joint of the invention illustrating the various positions of the joint during the sequence of operation thereof.
Figure 2B:
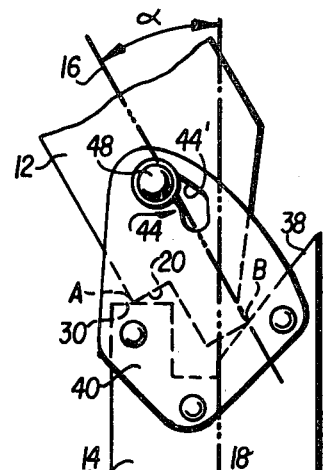
Figure 2C:
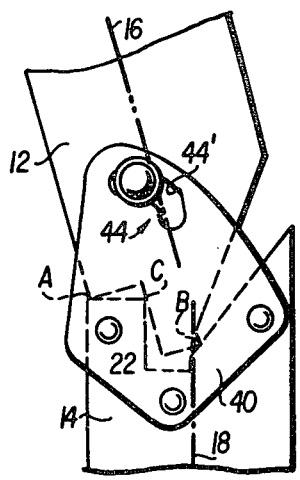
Figure 2D:
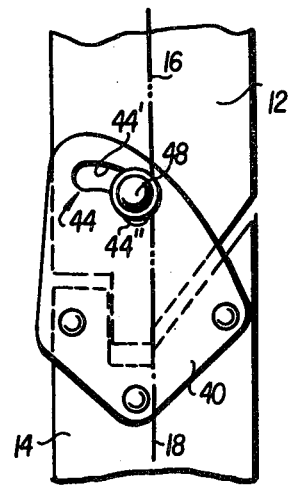
Figure 2E:
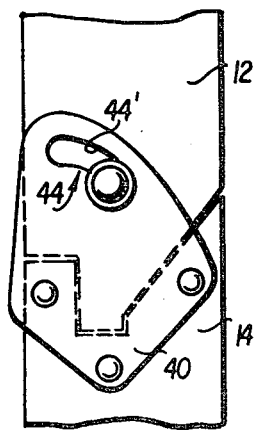

Turning now to FIGS. 2A–2E, the sequence of operation of the lockable joint according to the invention will be described as it progresses from an inoperative, unlocked position in FIG. 2A to the fully locked position in FIG. 2E. As seen in FIG. 2A, the member 12 is articulated to an angle greater than 90° relative to member 14 with the shaft 48 located in cam slot 44 at the extreme left-hand end of the arcuate portion 44'. In this inoperative position, which represents, for example, a stowed or preparatory position of the lockable joint, longitudinal forces applied along either of the axes 16 or 18 will not cause engagement of the confronting end surfaces of the joint.

In FIG. 2B, the axes 16 of member 12 has been angularly articulated by an external mechanism (not shown) relative to the axis 18 of member 14 within the design angle α which, in this particular embodiment, is about 25°. Assuming the member 14 is fixed and a force is applied along axis 16 of member 12, it will be seen that the shaft 48 bears against and coacts with the lower arcuate side of cam slot portion 44'. With continued application of such axial force, the shaft will slide downwardly and toward the right as seen in FIG. 2B resulting in a rotational force on and angular articulation of member 12 to reduce the angle α and urge member 12 toward the fully locked position. The coaction between surface 30 and point A on surface 20 and between inclined surface 38 and point B at the intersection of surfaces 24, 26 augments the rotational force between the shaft 48 and cam slot portion 44' and further progresses the parts toward the locked position.

As shown in FIG. 2C, continued angular articulation of member 12 resulting from the force applied along axis 16 causes point C on member 14 to contact surface 22 of member 12 thereby preventing leftward movement of member 12. The combination of the above-described forces in reaction to the axial force along axis 16 causes alignment of the axes 16, 18 as shown in FIG. 2D. In this position, the shaft has progressed along the entire length of arcuate cam slot portion 44' and is disposed in straight cam slot portion 44'' whereupon the axial force along axis 16 urges the confronting end of member 12 axially into engagement with the confronting end of member 14 as shown in FIG. 2E. Simultaneously, shaft 48 moves along straight cam slot portion 44'' and the joint is locked against further angular articulation.

Unlocking of the joint is accomplished in a similar manner by application of a tensile force to the joint, for example, by an axial force applied to member 12 directed away from member 14. In this case, however, the shaft 48 bears against the upper side of cam slot portion 44' and results in angular articulation of the member 12 progressively toward the position shown in FIG. 2B.

Also, the coaction between point C and surface 22 provides the primary augmenting force for rotating member 12 toward the unlocked position of the joint. While the cam slot portion 44' has been shown as an arcuate portion, it will be appreciated that, in certain applications, a substantially straight, but inclined cam slot portion will provide similar results.

Figure 3:
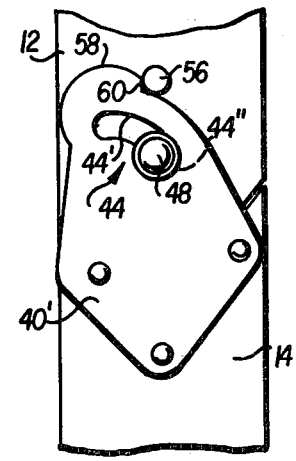
FIG. 3 is a perspective view of another embodiment of the lockable joint of the invention.

FIG. 3 illustrates a modification of the side plate 40 of the FIG. 1 embodiment. In this arrangement, an additional shaft 56 is provided on the member 12 axially spaced from shaft 48. The upper edge of the plate 40' is provided with curved and straight portions 58, 60, respectively corresponding essentially to the respective curved and straight cam slot portions 44' and 44''. This arrangement provides a further locking detent at portion 58 and a further angular articulating surface at portion 60.

Figure 4:
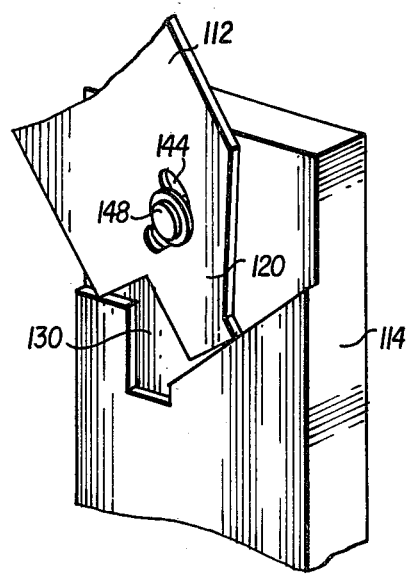
FIG. 4 is a perspective view, partly broken, of a third embodiment of the invention.
Figure 5:
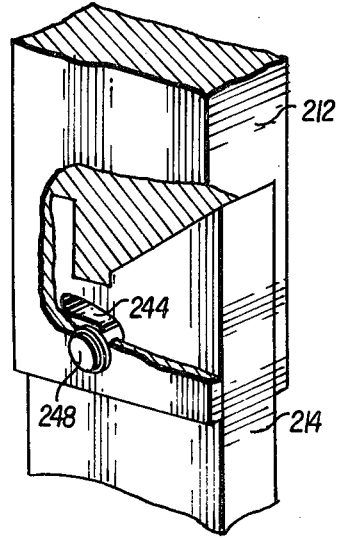
FIG. 5 is a plan view illustrating a modification of the FIG. 1 embodiment of the invention.

FIG. 4 illustrates an alternative embodiment of the lockable joint of the invention wherein one member 114 is of substantially greater thickness than the other member 112. The end of member 114 is provided with a configured recess 130, milled-out, for example, from one surface of member 114 and which matingly receives the corresponding configured projecting end 120 of member 112. A cam slot 144 is provided in member 112 and a shaft 148 is affixed to member 114. FIG. 5 illustrates another alternative embodiment wherein the end of a member 214 is received in a slotted end of a member 212, the engaging ends of the members being provided with mating surfaces similar to those of FIG. 1. A cam slot 244 is provided in member 214 and a shaft 248 is affixed to the slotted end of member 212 and passes through cam slot 244. The operation of the embodiments of FIGS. 4 and 5 is substantially identical to the operation of the FIG. 1 embodiment, the primary differences being in the location and orientation of the cam slot and shaft.

Although only preferred embodiments of the invention are specifically illustrated and described herein, it will be appreciated that many modifications and variations of the present invention are possible in light of the above teachings and within the purview of the appended claims without departing from the spirit and intended scope of the invention.

What is claimed:

1. A lockable joint for articulated members comprising first and second members having ends, said members being articulatable relative to each other between a locked position with said members axially aligned and an unlocked position with said members angularly offset from said axially aligned and locked position, nesting means arranged adjacent the ends of said members for preventing relative angular articulation of said members when in said locked position and means carried by said members and responsive to a force applied substantially axially to at least one of said members for angularly articulating said members relatively of one another between said unlocked and said locked positions, said angular articulation means comprising a shaft carried by one of said members and a cam slot carried by the other of said members and in which cam slot said shaft engages, said cam slot comprising a first portion substantially axially aligned with said other member and a second portion intersecting said first cam slot portion, said second cam slot portion emanating from a point transversely and axially offset from the intersection between said first and said second cam slot portions such that, upon application of an axial force to at least one of said members, said shaft engages said second cam slot portion and causes relative angular articulation of said members, said cam slot portions and shaft being located and arranged such that said shaft is positioned at the intersection between said first and second cam slot portions when said members are initially articulated to an axially aligned position, whereby continued application of said axial force is operative to move said shaft relatively of said first cam slot portion and urge said members into said locked position.

2. A lockable joint according to claim 1, wherein said angular articulation means is operative to relatively angularly articulate said members both from said locked position toward said unlocked position and from said unlocked position toward said locked position in response to a force applied axially to at least one of said members.

3. A lockable joint according to claim 1, wherein said nesting means comprises a plurality of complementary mating surfaces on the confronting ends of said members, at least some of the mating surfaces of said members coacting with one another during articulation of said members between said unlocked and locked positions, said coacting surfaces cooperating with said angular articulation means to guide said members between said unlocked and said locked positions.

4. A lockable joint according to claim 1, wherein said axial force is applied in a direction to urge said nesting means in compression.

5. A lockable joint according to claim 1, wherein said joint is operative with said members angularly offset in said unlocked position over a range of angles between 0° and about 45°.

6. A lockable joint according to claim 5, wherein the operative range of angles is between 0° and about 25°.

7. A lockable joint for articulated members comprising first and second members having ends, said members being articulatable relative to each other between a locked position with said members axially aligned and an unlocked position with said members angularly offset from said axially aligned and locked position, nesting means arranged adjacent the ends of said members for preventing relative angular articulation of said members when in said locked position and means carried by said members and responsive to a force applied substantially axially to at least one of said members for angularly articulating said members relatively of one another between said unlocked and said locked positions, said nesting means comprising a plurality of complementary mating surfaces on the confronting ends of said members, at least some of the mating surfaces of said members coacting with one another during articulation of said members between said unlocked and locked positions, said coacting surfaces cooperating with said angular articulation means to guide said members between said unlocked and said locked positions, the mating surfaces on the confronting end of a respective member including, successively, a first surface arranged perpendicular to the axis of said respective member, a second surface arranged parallel to said axis, a third surface arranged perpendicular to said axis, a fourth surface arranged parallel to said axis and a fifth surface inclined at an angle to said axis.

8. A lockable joint according to claim 7, wherein said coacting surfaces include at least one of first guide surfaces comprising the fifth surface of the first member and the intersection point between the third and fourth surfaces of the second member, second guide surfaces comprising the first surface of the first member and a point adjacent an end of the first surface of the second member, and third guide surfaces comprising the intersection point between the first and second surfaces of the first member and the second surface of the second member.

9. A lockable joint according to claim 8, wherein said coacting surfaces include all of said first, second and third guide surfaces.

10. A lockable joint according to claim 7, wherein said angular articulation means comprises a shaft carried by one of said members and a cam slot carried by the other of said members and in which cam slot said shaft engages, said cam slot comprising a first portion substantially axially aligned with said other member and a second portion intersecting said first cam slot portion, said second cam slot portion emanating from a point transversely and axially offset from the intersection between said first and said second cam slot portions, whereby, upon application of an axial force to at least one of said members, said shaft engages said second cam slot portion and causes relative angular articulation of said members.

11. A lockable joint according to claim 10, wherein said cam slot and shaft are arranged such that upon articulation of said members to an axially aligned position, said shaft is located in said first cam slot portion, whereby continued application of said axial force moves said shaft relatively of said first cam slot portion and urges said members into said locked position.

12. A lockable joint according to claim 10, wherein said second cam slot portion is curvilinear over substantially its entire extent.

13. A lockable joint for articulated members comprising first and second members having ends, said members being articulatable relative to each other between a locked position with said members axially aligned and an unlocked position with said members angularly offset from said axially aligned and locked position, nesting means arranged adjacent the ends of said members for preventing relative angular articulation of said members when in said locked position and means carried by said members and responsive to a force applied substantially axially to at least one of said members for angularly articulating said members relatively of one another between said unlocked and said locked positions, said nesting means comprising a plurality of complementary mating surfaces on the confronting ends of said members, at least some of the mating surfaces of said members coacting with one another during articulation of said members between said unlocked and locked positions, said coacting surfaces cooperating with said angular articulation means to guide said members between said unlocked and said locked positions, the mating surfaces on the confronting end of at least one member including a surface inclined at an angle to the axis of said one member.

* * * * *